P. M. BENEDICT.
ELECTRIC RIVETING MACHINE.
APPLICATION FILED MAR. 6, 1916.
1,346,631.
Patented July 13, 1920.
3 SHEETS—SHEET 1.
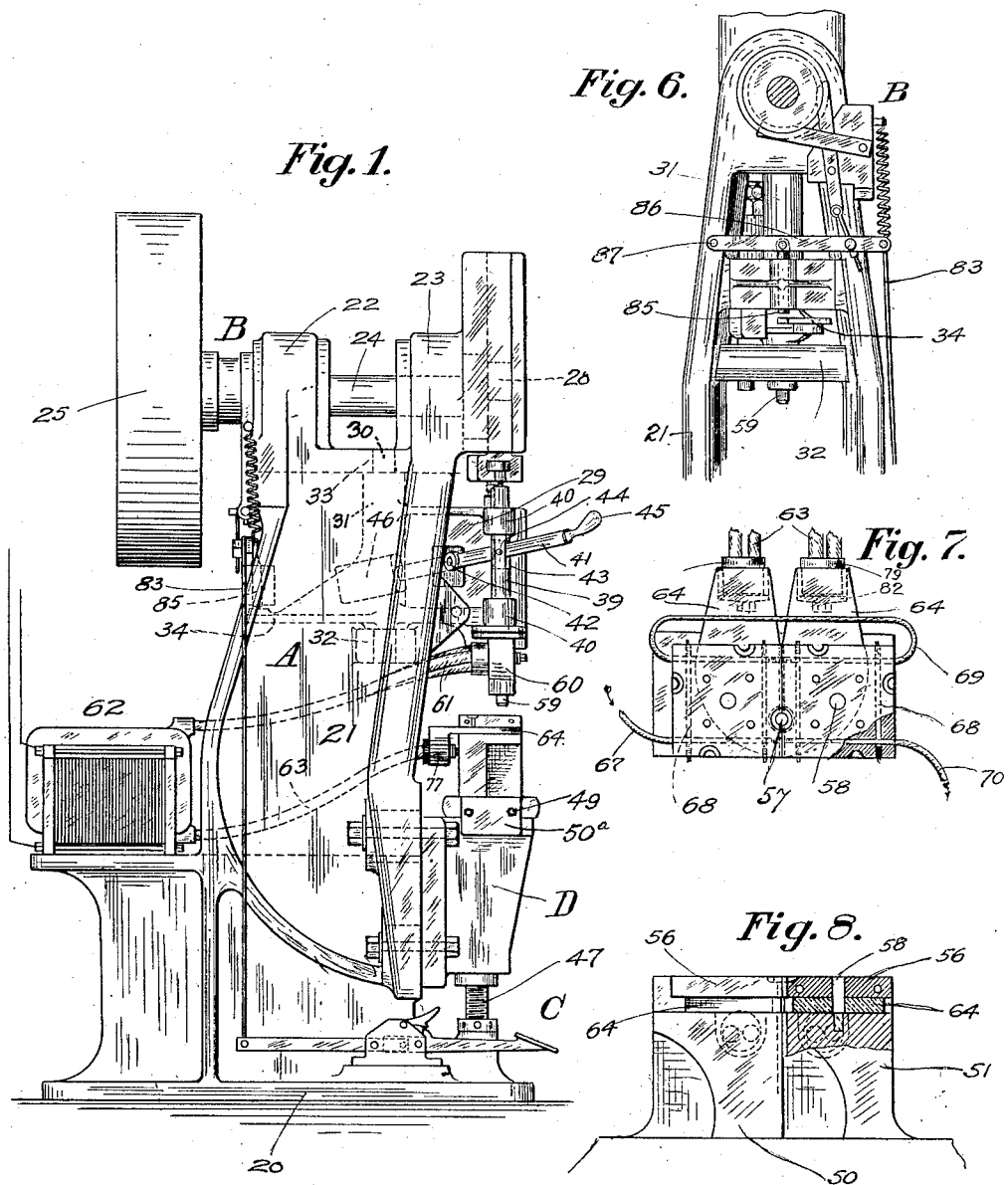

P. M. BENEDICT.
ELECTRIC RIVETING MACHINE.
APPLICATION FILED MAR. 6, 1916.

1,346,631.

Patented July 13, 1920.
3 SHEETS—SHEET 2.

WITNESSES:
Samuel J. Berard

INVENTOR.
P. M. Benedict
BY
ATTORNEY

P. M. BENEDICT.
ELECTRIC RIVETING MACHINE.
APPLICATION FILED MAR. 6, 1916.
1,346,631.
Patented July 13, 1920.
3 SHEETS—SHEET 3.
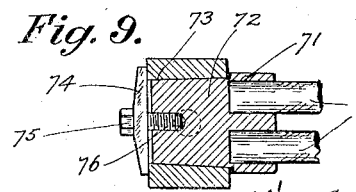
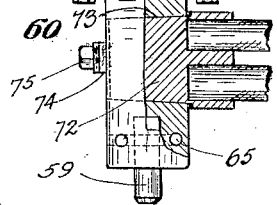
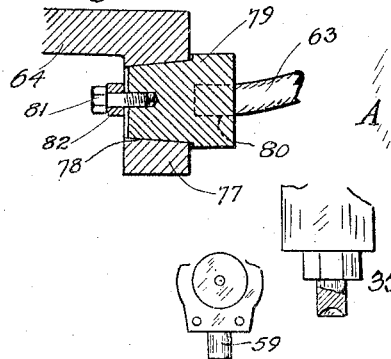
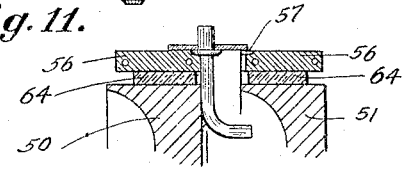
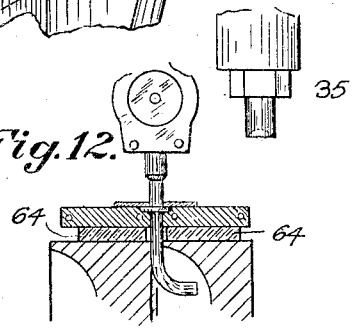
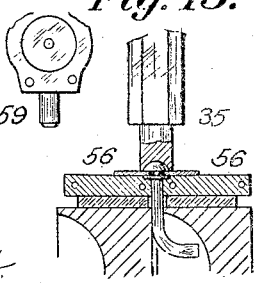

UNITED STATES PATENT OFFICE.

PAUL M. BENEDICT, OF NEW HAVEN, CONNECTICUT, ASSIGNOR TO THE BARNES & KOBERT MANUFACTURING COMPANY, OF MILLDALE, CONNECTICUT, A CORPORATION OF CONNECTICUT.

ELECTRIC RIVETING-MACHINE.

1,346,631.     Specification of Letters Patent.     Patented July 13, 1920.

Application filed March 6, 1916. Serial No. 82,495.

*To all whom it may concern:*

Be it known that I, PAUL M. BENEDICT, a citizen of the United States, residing in the city and county of New Haven and State of Connecticut, have invented certain new and useful Improvements in Electric Riveting-Machines, of which the following is a full, clear, and exact description.

This invention relates to a machine, apparatus or press for electric riveting, welding and similar operations, and more particularly to a machine of the type which is adapted to join two parts by riveting, heading or clenching a rivet shank or the like, that is heated by means of an electric current. My improved machine is of special utility in the manufacture of insulator brackets, strain insulators and various articles of hardware, but it may be used to advantage in the manufacture of many widely different articles.

One of the primary objects of the present invention is the provision of a machine or press in which the electric current is so supplied to the work piece and traverses the same in such a way that it is effectively heated prior to the riveting or other bending or working thereof. It is also aimed to furnish a machine which will operate indefinitely without necessitating repairs and which is very quick and convenient in operation, while at the same time it is economical in the consumption of current.

Another object of the invention is to furnish an improved electric riveting machine or press in which the work is heated while held stationary between suitable die members, by bringing an electrode in contact with said work piece, said electrode being mounted on a carrier which also supports a working plunger or punch, and said carrier being conveniently movable so that when the electrode is moved out of contact with the work piece the aforesaid plunger may be quickly and conveniently moved into alinement with the work piece and caused to descend on the same so as to form the hot metal into a rivet head, or perform such other operation as may be necessary.

The invention also has in view the general improvement in the construction and operation of machines or apparatus of the type to which the invention relates.

To these and other ends, the invention consists in the novel features and combination of parts to be hereinafter described and claimed.

In the accompanying drawings,

Figure 1 is a side elevation of an electric riveting press or machine embodying my improvements;

Fig. 3 is an enlarged fragmentary perspective view of the movable electrode, the metal bending plunger, the dies for holding the work piece, and the water connections for cooling the electrode and the dies;

Fig. 6 is a rear elevation of the upper portion of the machine with the belt pulley omitted;

Fig. 7 is a detail plan view of the dies and the lower conductor plates;

Fig. 8 is a front elevation, partly in section, of the parts shown in Fig. 7;

Fig. 9 is a horizontal detail section through the movable electrode holder;

Fig. 10 is a side elevation, partly in section, of said electrode holder;

Figure 14:
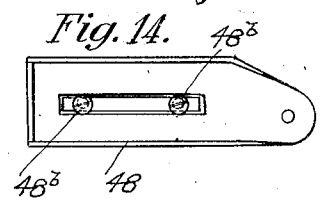

Fig. 10$^a$ is a sectional view of one of the plates connected with a die member;

Figs. 11, 12 and 13 are diagrams showing different stages of the operation of the machine; and Fig. 14 is a diagrammatic view of a mounting for a work holder.

Referring to the drawings, I have illustrated my improvements as applied to a machine in the nature of a press having a die bed, a vertically reciprocating plunger, and an upper power shaft from which the plunger is operated. The frame A of the press is of more or less usual construction, being provided with a suitable base 20, from which rise side frames or standards 21 that join each other at the top of the machine where bearings 22, 23 are provided for a driving shaft 24 driven in the ordinary manner by a belt pulley 25, or other suitable means. At the upper front part of the machine, the frame carries a guide or slideway 26 in front of the bearing 23 in which slideway a crosshead 27 is adapted to reciprocate vertically.

This cross-head 27 is engaged by a crank pin 28 on the forward end of the shaft 24, so that as the shaft is rotated, the cross-head or slide 27 is moved up and down. As usual in machines of this character, a clutch B of suitable construction is interposed between the driving pulley 25 and the driving shaft 24. This clutch is normally disengaged, but by actuating a treadle C, the shaft 24 may be rotated to cause the descent of the slide or cross-head, which will then operate the riveting punch or plunger, as hereinafter described.

Figure 4:
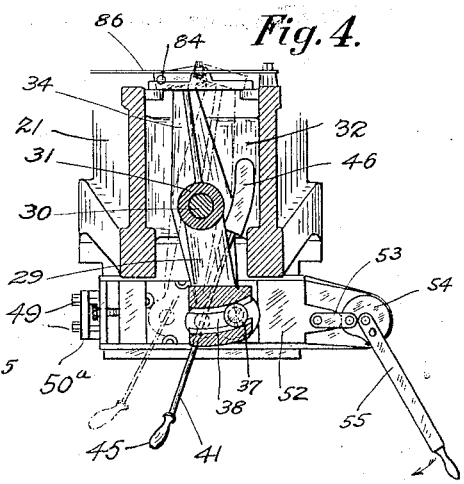
Fig. 4 is a fragmentary section on line 4—4 of Fig. 2.

The punch or plunger actuated by the slide 27 is not rigidly connected with said slide, but is mounted on a carrier movably supported on the machine frame so as to be movable over the work piece. In the particular form shown, the carrier which supports the plunger is in the form of a swinging bearing plate or block 29 mounted to turn about a vertical axis. Preferably, the plate or block 29 is swiveled in the machine between the side frames by means of an upright stud shaft 30. The plate or block 29 has a hub 31 embracing said shaft. The lower end of the shaft is supported in a step bearing in a cross-web 32 of the machine frame, and said shaft is provided with another bearing at the top of the frame, as indicated at 33 in Fig. 1. Extending rearwardly from the bearing block or carrier 29 is an arm 34, located at the rear of the shaft 30, as shown at Fig. 4.

At the front of the carrier or block 29, the same is provided with a separable bearing for a vertically arranged plunger 35. This plunger is adapted to reciprocate vertically, and rotary movement thereof in the bearing is prevented by the polygonal cross-section of the plunger, which engages a correspondingly shaped opening in the carrier or block. Extending upwardly beyond the bearing block is a neck portion 36 at the upper part of the plunger surmounted by a head 37. The head 37 is preferably in the shape of a disk, and it engages a slot 38 in the lower end of the slide 27. This slot 38 is of T-shaped cross-section and open at the bottom for the passage of the neck 36. After the head or disk 37 has been inserted into the slot from one end, the plunger 35 will be connected with the slide 27 for vertical movement in both directions with said slide, as will be obvious, irrespective of the lengthwise movement of the head 37 in the slot 38. In plan, the slot 38 is of arcuate form, the center of the curve being coincident with the center of the swivel stud or shaft 30, so that the plunger, in spite of its connection with the slide 27, may be moved laterally of the machine in either direction by movement of the carrier 29.

Figure 2:
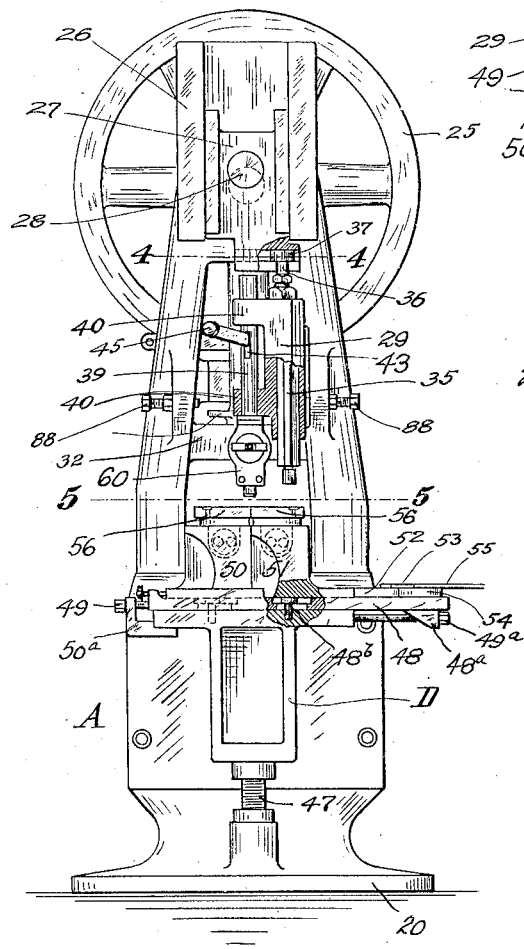
Fig. 2 is a front elevation of the same.

In the particular form shown, a suitable electrode holder is mounted on the carrier at one side of the riveting plunger and adapted to move vertically. In this particular instance, the electrode holder is mounted at the lower end of a vertically sliding spindle mounted at the left of the riveting plunger, as shown in Fig. 2. The slide or spindle 39 is mounted in upper and lower bearings 40 on the carrier member 29 which project laterally from that portion which guides the riveting plunger, and the spindle supports at its lower end beneath the lower bearing an electrode or electrode holder, as hereinafter more particularly described. For the purpose of raising and lowering the spindle 39, a suitable operating lever 41 may be provided, which lever is pivoted intermediate of its ends to the carrier 29, at 42, in such a manner as to swing in a vertical plane, the forward portion of said lever extending through a slot 43 in the spindle 39 and being pivoted to the spindle in said slot by a pin 44. At the front extremity, the lever 41 is provided with a suitable operating handle 45. Preferably, the electrode-carrying spindle is normally held in a raised position by appropriate means, such as a counterweight 46 on the rear end of the lever 41. In this way, the electrode is normally held at some distance above the work, as hereinafter described, although it may be depressed at any time by pulling down on the operating lever 41, as will be understood.

Figure 5:
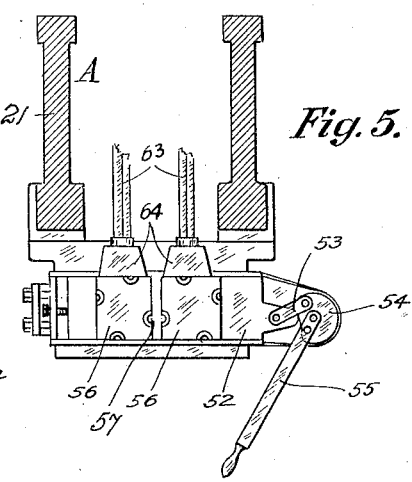
Fig. 5 is a fragmentary section on line 5—5 of Fig. 2.

The work holding devices are preferably mounted beneath the plunger or punch and the electrode holder in the following manner: At the lower front part of the press, a table D is mounted so as to be vertically adjustable. In the particular form shown, the table D is mounted in a slideway in the front of the machine frame, and is adapted to be raised and lowered by rotating a feed screw 47. On top of the table is a member or fixture 48 in the nature of a guide, which is adjustable both longitudinally and transversely of the machine frame. The lengthwise adjustment of the fixture 48 may be effected by means such as screws 49 passing through a bracket 50ª secured to one end of the table and abutting one end of the guide member 48, and a screw 49ª socketed in the table and engaging a shoulder 48ª on the fixture or member 48 at the end opposite the screws 49. Transverse adjustment of the member 48 may be effected by moving it in place by appropriate means such as cam-headed bolts 48ᵇ when the adjustment has been effected. Vertical adjustment can, of course, be obtained by lifting or lowering the table D. The member 48 serves as a mounting for a work holder composed of a pair of relatively movable work holding elements or jaws 50, 51. Each of these work holding jaws comprises a supporting block and a die plate or member surmounting the same, there being a suitable conducting plate for conveying the electric current, interposed between the block and the die plate, as hereinafter described. The jaw 50 in the present instance is intended to be stationary, whereas the jaw 51 may be moved toward and away from the same in a direction lengthwise of the die head. Both of the jaws are preferably mounted in an undercut groove in the member 48, and in the particular form shown, the jaw 51 has a lateral extension 52 on its supporting block connected by a link 53 with a crank disk 54 mounted to turn on a lateral extension of the member 48. The link 53 is pivoted eccentrically of the disk, and the latter may be turned by an operating lever 55, for the purpose of moving the holder jaw 51 in the desired direction in its guideway. In the position shown in Fig. 4, the jaw 51 is moved into close proximity to the jaw 50, but by turning the operating lever 55 in the direction of the arrow, the jaw 51 may be shifted to the right to separate the jaws, as shown in Fig. 5.

Each of the jaws 50, 51 is provided with a die plate 56 clamped to the top of the same, and the work piece is intended to be tightly clamped in the die formed by the die plates, in the manner shown in Figs. 11, 12 and 13. The machine selected for illustration is particularly designed for riveting supporting plates to the shanks of insulator brackets, the end of the shank being passed through an opening in the plate so that a shoulder on the shank supports the plate, as shown in Fig. 11. The protruding end of the shank is then heated and hammered down to form a rivet head, whereby the plate is tightly clenched against the shoulder. The steel die plates are provided with recesses 57 at their meeting edges, adapted to accommodate a portion of the shank including the shoulder. In other words, the die plates in conjunction form a cylindrical die or seat which tightly fits the shank when the jaws 50, 51 are brought together, as shown in Fig. 12, the upper portion of the cylindrical seat being cut away to receive the shoulder on the bracket shank. Owing to the curved form of the work piece selected for illustration, the supporting block of the jaw or member 51 is cut away so that the jaws will clamp only the upper portion of the shank. In the particular form shown, each of the die plates 56 is secured on its supporting block by a clamping screw 58 located centrally of the die plate, and for the sake of economy each die plate, which is of square shape, is provided at each side with a recess or half-socket 57 adapted to coöperate with a similar half-socket of the other die in seating the work piece. Thus, when one of the work receiving sockets formed conjointly in the two die plates is worn or otherwise injured, the plates can be turned on their axes so as to provide an entirely new die socket.

The work piece is heated electrically by passing a current through the portion thereof which is to be riveted or upset, such current traversing both of the die plates 56 and an electrode 59, which is carried by the spindle 39, and is moved down into contact with the upper end of the bracket shank or other work piece. In the particular form shown, the upper movable electrode 59 adapted to make contact with the upper end of the work piece is mounted in a separate electrode holder 60, as best shown in Figs. 3, 9 and 10. This electrode holder is connected by conductors 61 with one pole of the secondary coil of a suitable transformer 62, supplied with current from an appropriate source, while the other pole of such secondary coil or winding is connected by suitable conductors 63 with the die plates 56 by way of appropriate conducting plates 64 interposed between the die plates and their respective supporting blocks. In this manner, when the work piece is clamped in place between the die plates, the electrical circuit will be completed by contact of the electrode 59 with the upper end of the work piece, as shown in Fig. 12, and with a transformer and conductors of proper capacity and design the protruding end of the work piece which is to be headed or riveted can be quickly heated to the required temperature for efficient riveting.

In the particular example illustrated, the electrode holder is insulated from its carrier and from other parts of the machine structure, the current being grounded in the machine through the conducting plates 64. The electrode holder 60 is preferably composed of a massive block of copper, which is the best material known for this purpose, and the copper block is provided with a flange 61$^a$ by means of which it is clamped by bolts 62$^a$ to a flange 63$^a$ on the lower end of the supporting spindle 39, the insulation of the electrode block from the rest of the machine being provided for by interposing suitable insulating material in the flanged joint, as shown at 64' in Fig. 10. The electrode proper 59 is in the form of a rod suitably socketed in the lower end portion of the holder block, and in order to maintain the electrode at a sufficiently low temperature during the operation of the machine, suitable means should be provided for cooling the same. In the particular form shown, a water passage 65 in the lower end of the holder extends around the electrode 59. Water is conducted to the passage 65 by a flexible tube 66. It is also necessary to cool the die plates to prevent them from becoming red-hot during the operation of the machine, and in the particular example illustrated, the water circulating through the passage 65 in the electrode holder passes out from such electrode holder through a flexible tube 67, thence into a water passage 68 in one of the die plates 56, thence through a flexible tube 69 to a similar passage 68 in the other die plate, and thence to waste through a tube 70. The water passages in the die plates may be formed by drilling holes parallel to the respective sides, and then plugging up the ends of certain holes with small screw plugs, as shown in Fig. 7, and the water passages in the electrode holder may be drilled in a similar manner.

In a machine of this kind, the heating current is very large, say eight thousand amperes, but there is an extremely low potential, say one and one-half volts. It is obvious, therefore, that in the machine itself the current must at all points be conducted with a minimum of resistance, and in making connections in the electric circuit, it has been found necessary to provide tight joints or connections of large cross-section. In the form shown, connection of the secondary winding of the transformer with the electrode holder is made by four conductors 61 of large cross-section, which enter sockets 71 of a connecting plug 72, engaging a socket 73, in the intermediate part of the electrode holder. This plug 72 is preferably made of copper and is tapered toward the forward end, the socket 73 being correspondingly tapered and being extended through the electrode from front to rear. A bridge piece 74 extends across the socket at the front so as to be supported at its ends on the side portions of the electrode holder, and a bolt or screw 75 passes through this bridge piece into engagement with a threaded socket 76 in the forward end of the tapered plug. It will be understood, therefore, that by screwing the bolt 75 into the socket of the plug, the plug will be drawn forward in the tapered socket 73. In this way, by providing clean, smooth contacting surfaces between the plug and the socket in the electrode holder, and drawing the plug as far forward as possible by means of the bolt, the plug and electrode holder may be held in tight contact over a surface of considerable area, so that the current will have no appreciable resistance offered to its passage. It will be observed from Fig. 9 that those portions of the electrode holder which are disposed at opposite sides of the plug are of considerable cross-sectional area.

Referring now to the conducting plates 64, it will be observed that each of these plates is of considerable area so as to make contact with the under surface of the corresponding die plate over a considerable area. The upper surface of each plate is clean and smooth, and the lower surface of the corresponding die plate is clean and smooth, so that when the corresponding screw 58 is tightened, the two plates will make good electrical contact with each other. The plates 64 are preferably made of copper of considerable thickness, and preferably they are connected with the conducting wires in substantially the same manner in which the conducting wires are connected with the electric holder. For this purpose, each of the conducting plates is provided at its rear extremity with a down-turned flange 77 having a tapered socket 78 similar to the socket 73 in the electrode holder. A tapered plug 79 of copper similar to the plug 72, having sockets 80 in which two conductors 63 are soldered, engages the socket 78 and is tightly clamped therein by means of a bolt 81 and bridge piece 82 in substantially the manner previously described.

It has been previously stated that the clutch B is operated by the treadle C when it is desired to actuate the cross-head 27 and the plunger 35. In actuating the press to depress the plunger, it is necessary to pull down a rod 83 forming a part of an ordinary clutch mechanism. In order, however, to prevent depression of the plunger except when it is in line with the work piece, the rearwardly extending arm of the carrier is provided with a perforation 84 adapted to be moved into and out of registry with a pin 85 which moves downward when the rod 83 is pulled down. In the form shown, the rod 83 is connected to one end of a lever 86 pivoted to the frame at 87, and connected intermediate of its ends with the pin 85, as shown in Fig. 6. When the riveting plunger is in line with the work piece, as shown in Fig. 13, the hole or perforation formed in the outer end of the extension 34 is in line with the pin 85 so that the latter can pass through it to permit the pulling down of the rod 83 and the actuation of the clutch, but when the riveting plunger is out of line with the work piece, the solid portion of the arm or extension 34 of the carrier, blocks the downward movement of the pin 85 and thereby prevents the actuation of the clutch for causing the descent of the plunger.

The operation of the improved machine will be more or less obvious from the foregoing description. It will be apparent that the carrier 29 can be readily swung to the right or left by means of the operating lever 41, which is also used to depress the electrode. Adjustable stops 88 of a suitable kind are carried by the side frames of the machine so as to limit the swing of the carrier in both directions. In Fig. 2, the electrode is in a position to descend vertically on the work piece. In Fig. 11, the electrode is somewhat to the left of the work piece, but by actuating the lever 41, it may be brought into line with the same. The work is clamped between the die plates 56 by operating the lever 55, as previously described, whereupon the electrode is moved down into contact with the upper end of the work piece, as shown in Fig. 12. Thus, the alternating electric current which is preferably used passes through the entire upper end portion of the work piece from the electrode at the end of the piece to the die plates which surround it to a point remote from the end, although in some cases it may be advantageous to have the electrode 59 the positive pole of a direct current circuit. In this manner, the upper end portion of the bracket shank or other piece surrounded by the attaching plate is heated very quickly to a high temperature, while the electrode is momentarily held in contact with the work piece by depression of the operating lever. The lever is then released so that its counterweight will raise it again, and during the raising movement lateral pressure is exerted on the lever so as to swing the carrier into a position in which the plunger 35 is in line with the work piece. The treadle C is then depressed, and as the driving shaft 24 is then actuated to operate the cross-head 27, the plunger is forcibly brought down on the heated shank of the work piece so as to rivet or clench it, or perform some other operation depending upon the character of the work.

While I have described with considerable particularity the embodiment of my invention selected for illustration I wish to have it understood that various changes in the details of the construction may be made without departing from my inventive idea as expressed in the claims.

What I claim is:—

1. In a machine such as described, the combination of separate die plates adapted to clamp the work between them, conductor plates in contact with the respective die plates, electric conductors connected with said conductor plates, and a movable electrode having a different electric conductor connected thereto and adapted to make contact with the work; substantially as described.

2. In a machine such as described, the combination of a pair of relatively movable supporting members, conductor plates of extended area arranged flatwise in contact with the upper faces of the respective members, die plates mounted on top of the respective conductor plates for clamping the work and engaging the upper faces of said conductor plates over a considerable area, means for clamping the die plates tightly on the conductor plates, separate electric conductors, and detachable means for connecting said conductors with the respective conductor plates to insure a good electrical connection.

3. In a machine such as described, the combination of a pair of supporting members movable relatively to each other, conductor plates of extended area arranged flatwise in contact with the respective members, die plates mounted on the respective conductor plates and adapted to clamp the work, electric conductors connected with said conductor plates, and an electrode having a different electric conductor connected thereto and adapted to contact with the work while the latter is held by said die plates, said die plates having passages through which cooling water is conducted; substantially as described.

4. In a machine such as described, the combination of a slideway, a pair of supporting blocks mounted therein, conductor plates superposed on the respective blocks, die plates superposed on said conductor plates and adapted to clamp the work between them, an electric conductor connected with the respective conductor plates, and an electrode having a different electric conductor connected thereto and adapted to close the circuit by contacting with the work piece substantially as described.

5. In a machine such as described, the combination of a die plate, a copper conductor plate of considerable area lying flatwise against the die plate, detachable means for interclamping said plates, the conductor plate being extended laterally beyond the die plate, a flexible electric conductor, and detachable means for connecting said flexible conductor with the laterally extending portion of the conductor plate so as to insure a good electrical connection between said parts.

6. In a machine such as described, the combination of a die plate, a conductor plate of extended area beneath the die plate, detachable means for clamping the die plate tightly against the upper surface of the conductor plate, a flexible electric conductor, a tapered plug permanently connected with one end of said flexible conductor, and engaging a tapered socket in said conductor plate, and adjustable means for forcing said plug into said socket so as to obtain a good electrical connection between the said parts.

7. In a machine such as described, the combination of a slideway, a pair of supporting blocks mounted therein, conductor plates superposed on the respective blocks, die plates superposed on said conductor plates and adapted to clamp the work between them, said conductor plates being provided with tapered sockets, a tapered plug adjustably mounted in each of said sockets, means for moving said plugs into tight contact with the walls of the sockets, an electric conductor connected with the respective plugs, and an electrode having a different electric conductor connected thereto and adapted to close the circuit by contacting with the work piece.

8. In a machine such as described, the combination of a slideway, a pair of supporting blocks mounted therein, conductor plates superposed on the respective blocks, die plates superposed on said conductor plates and adapted to clamp the work between them, said conductor plates being provided with tapered sockets, a tapered plug adjustably mounted in each of said sockets and means comprising a bridge piece extending across the socket, a coöperating member for moving said plugs into tight contact with the wall of the sockets, an electric conductor connected with the respective plugs, and an electrode connected with a different electric conductor and adapted to close the circuit by contacting with the work piece.

9. In a machine such as described, the combination of a work-supporting die adapted to support a work piece therein, an electrode movable into contact with said work piece, electrical conductors adapted to supply current to said die and electrode, and means for connecting said conductors to said die and to said electrode, including tapered sockets having tapered plugs tightly mounted therein.

10. In a machine such as described, the combination of a work-supporting die adapted to support a work piece therein, an electrode movable into contact with said work piece, electrical conductors adapted to supply current to said die and electrode, and means secured to said die and said electrode for electrically connecting the conductors thereto, each of said means having a tapered socket formed therein, a tapered plug adjustably mounted in each of said sockets, a bridge piece extending across each of said sockets having coöperating means for moving said plugs into tight engagement with the walls of the sockets and means for securing said conductors to said plugs; substantially as described.

11. In a machine such as described, a pair of relatively movable supporting blocks, die plates mounted upon said blocks and adapted to clamp the work between them, a conductor plate positioned between at least one of said blocks and its die, said conductor plate being provided with a tapered socket, a tapered plug adjustably mounted in said socket, means for moving said plug into tight contact with the walls of the socket, an electric conductor connected with said plug, and an electrode having a different electric conductor connected thereto and adapted to close the circuit by contacting with the work piece.

In witness whereof I have hereunto set my hand on the 4th day of March, 1916.

PAUL M. BENEDICT.